United States Patent
Coyle et al.

(10) Patent No.: US 6,196,823 B1
(45) Date of Patent: Mar. 6, 2001

(54) DIE CLAMP ASSEMBLY

(75) Inventors: Dennis Joseph Coyle, Clifton Park, NY (US); Fernando Alves Silva, Ludlow, MA (US); Eric Thomas Gohr, Evansville; Ricky Joe Renschler, Mt. Vernon, both of IN (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/524,822

(22) Filed: Mar. 14, 2000

Related U.S. Application Data

(62) Division of application No. 09/130,195, filed on Aug. 5, 1998, now Pat. No. 6,126,430.

(51) Int. Cl.$^7$ .................................................. B29C 47/12
(52) U.S. Cl. ...................... 425/188; 425/190; 425/192 R; 425/197
(58) Field of Search ....................... 425/188, 190, 425/192 R, 197

(56) References Cited

U.S. PATENT DOCUMENTS

| | | | |
|---|---|---|---|
| 2,486,474 | 11/1949 | Henning | 118/125 |
| 2,990,576 | 7/1961 | Van Riper | 425/197 |
| 3,632,279 | * 1/1972 | Christy et al. | 425/450 |
| 3,727,678 | * 4/1973 | Schott, Jr. | 165/64 |
| 3,873,399 | * 3/1975 | Goldsworthy et al. | 156/441 |
| 4,043,722 | * 8/1977 | Baker et al. | 425/174.8 |
| 4,124,346 | * 11/1978 | Greenwood et al. | 425/188 |
| 4,201,534 | * 5/1980 | Phipps | 425/461 |
| 4,720,251 | * 1/1988 | Mallay et al. | 425/67 |
| 4,892,473 | * 1/1990 | Elia et al. | 425/197 |
| 4,986,743 | * 1/1991 | Buehning | 425/7 |
| 5,375,990 | 12/1994 | Krupa et al. | 425/133.5 |
| 5,762,975 | 6/1998 | Rockstedt | 425/186 |
| 5,776,519 | 7/1998 | Flammer | 425/188 |
| 5,888,557 | * 3/1999 | Houk | 425/186 |

FOREIGN PATENT DOCUMENTS

| | | |
|---|---|---|
| 1 257 420 | 12/1967 | (DE) . |
| 0 347 589 | 5/1989 | (EP) . |
| 765383 | 1/1957 | (GB) . |

* cited by examiner

*Primary Examiner*—Harold Pyon
*Assistant Examiner*—Joseph S. Del Sole
(74) *Attorney, Agent, or Firm*—Noreen C. Johnson; Douglas E. Stoner

(57) ABSTRACT

A die clamp assembly for an extruder comprises at least one passage through which product being extruded flows. The die clamp assembly is attached to an extruder and comprises a last barrel that is connectable to the extruder. The last barrel comprising a flange and the extruder and last barrel define at least one passage through which product flows; at least one die body comprising at least one die body passage that communicates with the at least one passage; and at least one die plate that comprises at least one die plate passage that communicates with the die body passage and at least one opening so product can be extruded from the at least one opening. A clamp collar assembly connects corresponding peripheral surfaces of the last barrel to the die body, and comprises a closed position that connects the last barrel to the die body and an open position that permits separation of the last barrel and the die body. Further, a pivot assembly pivotally supports the clamp collar assembly for movement in a first direction and a second direction and the die body for movement in the second direction. The die body and the die plate are pivotable away from the last barrel when the clamp collar assembly has been pivoted to the open position.

18 Claims, 10 Drawing Sheets

DIE CLAMP ASSEMBLY

This application is a divisional of application Ser. No. 09/130,195, filed Aug. 05, 1998, now U.S. Pat. No. 6,126,430, which is hereby incorporated by reference in its entirety.

FIELD OF THE INVENTION

The invention is related to a die clamp assembly. In particular, the invention is related to a die clamp assembly for an extruder.

BACKGROUND OF THE INVENTION

Extrusion dies are attached to a last barrel of an extruder to form a processed material into desired products. Accordingly, the die should have a structure, clamping arrangements or other such means for attachment to the extruder.

There are many types of extrusion dies for extruders that form products of differing shapes and geometries. A sheet extrusion die takes a processed material, for example, a fluid stream usually flowing in a pipe, and shapes it into a thin, wide, uniform flat sheet of uniform-flowing fluids. A film extrusion die takes a fluid stream and shapes it into a thin, wide, uniform film. A stranding extrusion die takes a fluid stream and shapes it into a wide row of uniform-flowing strands. A profile extrusion die takes a fluid stream and shapes it into a complex and often multi-dimensional article, such as a door frame. These types of extrusion dies are discussed in the art.

An extruder die may comprise a screen pack, which can be provided in combination with a breaker plate. The screen pack is located at a predetermined position in or next to the extruder die to filter product as it passes through the extruder die or before the product has passed through the extruder die, and is retained in place by a clamping attachment arrangement. Preferably, the screenpack is located in the extruder die to filter the processed material as it passes through the extruder die. Screen packs in extruder dies must be periodically changed to ensure that their filtering is effective. Often the changing of the screen pack is long, laborious and time intensive process. Further, the changing of a screen pack often may cause considerable spillage, and accordingly resulting in large amounts of product waste.

There are several known clamping attachment arrangements available commercially to attach together an extruder die, screen packs, and an extruder. These clamping attachment arrangements are often cumbersome. Most clamping attachment arrangements are not positioned for an easy and expedited screen pack changing process, and are often inadequately arranged and positioned so as to cause considerable spillage and a waste of resources. Further, these clamping arrangements do not provide their own independent support and rely upon support from other external structures.

For example, one clamping arrangement comprises two collars, which bolt together at both ends. The collars however are not provided with their own separate support, and are generally hung from an overhead chain that renders the clamping arrangement awkward to manipulate and hard to use. Further, this type of support makes operation of the clamping arrangement potentially dangerous, which is undesirable. Other known clamping arrangements comprise complex two-bolt clamping arrangement designs. The two-bolt clamping arrangements are horizontally split, and attached to a flange of a last barrel of an extruder apparatus. When these clamping arrangements are opened, processed material from the extruder apparatus will often spill and drool onto the clamp mechanism, which of course is undesirable.

A vertically split one-bolt clamping arrangement design for an extruder die is also known, and is attached to a flange of an extruder's last barrel. This clamping arrangement design includes a pivot pin on a top portion and a bolt on the bottom to support the arrangement. The bolt is positioned in a location that is very difficult to access. Thus, product often falls onto the bolt, which is undesirable since it makes the arrangement more difficult to use.

Therefore, it is desirable to provide an extrusion die clamping assembly that permits for easy operation and quick-change of screen packs. It is also desirable to provide a mounting mechanism that allows a die and clamp to swing away from the extruder and attaches a mounting mechanism directly to the extruder so additional support structures are unnecessary. Further, it is desirable to provide a clamping arrangement that is small, light weight, and easy to use. Accordingly during a filter changing process, a minimum amount of spillage and reduced downtime are achieved to avoid large clean-ups and to conserve resources.

SUMMARY OF THE INVENTION

Accordingly, it is desirable to provide an extrusion die clamping assembly that overcomes the deficiencies of known clamping arrangements.

Accordingly, in an exemplary embodiment of the invention, an extrusion die clamp assembly for an extruder comprises at least one passage through which product flows. The extrusion die clamp assembly is attachable to an extruder and comprises at least one adapter plate that is connectable to the extruder. The extrusion die clamp also comprises at least one adapter plate passage that communicates with the passage of the extruder; at least one die body comprising at least one die body passage that communicates with the adapter plate passage; and at least one die plate that comprises at least one die plate passage that communicates with the die body passage and at least one opening so product can be extruded from the at least one opening. A clamp collar assembly connects corresponding peripheral surfaces of the adapter plate to the die body, and defines a closed position that connects the adapter plate to the die body and an open position that permits separation of the adapter plate and the die body. Further, a pivot assembly pivotally supports the clamp collar assembly for movement in a first direction and a second direction and the die body for movement in the second direction. The die body and the die plate are pivotable away from the adapter plate when the clamp collar assembly has been pivoted to the open position.

Further, another embodiment of the invention provides an extruder with an extrusion die clamp assembly, where the extruder comprises at least one passage through which product flows. The extrusion die clamp assembly is attachable to an extruder and comprises at least one adapter plate that is connectable to the extruder. The extrusion die clamp also comprises at least one adapter plate passage that communicates with the passage of the extruder; at least one die body comprising at least one die body passage that communicates with the adapter plate passage; and at least one die plate that comprises at least one die plate passage that communicates with the die body passage and at least one opening so product can be extruded from the at least one opening. A clamp collar assembly connects corresponding peripheral surfaces of the adapter plate to the die body, and defines a closed position that connects the adapter plate to the die body and an open position that permits separation of the adapter plate and the die body. Further, a pivot assembly pivotally supports the clamp collar assembly for movement in a first direction and a second direction and the die body for movement in the second direction. The die body and the die plate are pivotable away from the adapter plate when the clamp collar assembly has been pivoted to the open position.

Another embodiment of the invention provides a die clamp assembly adapted for connection to a last barrel of an extruder. The last barrel comprises a flange and the extruder and the last barrel defines at least one passage through which product flows. The die clamp assembly comprises a mounting connecting structure that communicates with the last barrel at least one passage of the extruder; a die body comprising at least one die body passage that is in fluid communication with the last barrel, where the at least one die body comprises a peripheral surface that corresponds to the flange; a clamp collar assembly that positions the flange and peripheral surface against each other in a closed position, and permitting the last barrel and the at least one die body to be separated from each other to an open position. The die clamp assembly also includes a pivot assembly that supports the clamp collar assembly for movement in a first pivot direction and a second pivot direction. The die body is moved in the second pivot direction, and the clamp collar assembly is movable so the die body and the at least one die plate are each separately pivotable away from the last barrel in the second pivot direction. The mounting connecting structure supports the die body, clamp collar and pivot assembly on the last barrel of the extruder.

These and other aspects, advantages and salient features of the invention will become apparent from the following detailed description, which when taken in conjunction with the annexed drawings, disclose embodiments of the invention.

BRIEF DESCRIPTION OF THE DRAWINGS

While the novel features of this invention are set forth in the following description, the invention will now be described from the following detailed description of the invention taken in conjunction with the drawings where like parts are designated by like reference characters, and in which.

DETAILED DESCRIPTION OF THE INVENTION

The die clamp assembly, as embodied by the invention, provides an easy operation and quick-change of screen packs. This die clamp assembly is of moderate cost. In the following discussion, the die clamp assembly is discussed as an extrusion die clamp assembly, however this description is not meant to limit the invention in any way, and is merely exemplary. The scope of the invention includes use of the die clamp assembly on other processing devices. The extrusion die clamp assembly is relatively small and light, and is easily maintained. The extrusion die clamp assembly is also a modular design as it can be fitted onto most known extruders and permits interchangeability of parts. The extrusion die clamp assembly comprises its own pivots and supports so that the assembly is simply connected to an extruder without additional external support.

The inventive extrusion die clamp assembly can be used with most known extruders. Numerous extrusion dies are commercially available, and these vary dependent on the intended use, desired end product and other variables. Accordingly, a further discussion of extruders within the scope of the invention is omitted.

The extrusion die clamp assembly is attached to an appropriate size existing flange of an extruder, and alternatively an appropriate size adapter is provided to connect the extrusion die clamp assembly to the extruder. This arrangement allows the extrusion die clamp assembly to mate with any extruder since the extruder and flange do not have to be formed together with mating complementary surfaces. As with most extruders where the extruder and die are heated, the components of the extrusion die clamp assembly are heated to facilitate product flow. The heating of the components can be accomplished using any known heating method and system, and accordingly, a further discussion of heating is omitted.

In the following discussion with reference to FIGS. 1–10, only one of each of the extruder die clamp assembly features will be discussed. The scope of the invention, however, includes two or more of each of the features. Also, the directions and orientation as discussed in the following description are with respect to the drawings, and are not meant to limit the invention in any way. For example, "up", "down", "clockwise", "counterclockwise", "left", and "right" are for explaining the drawings, and are not meant to in any way limit the orientation of the device in operation.

Figure 1:
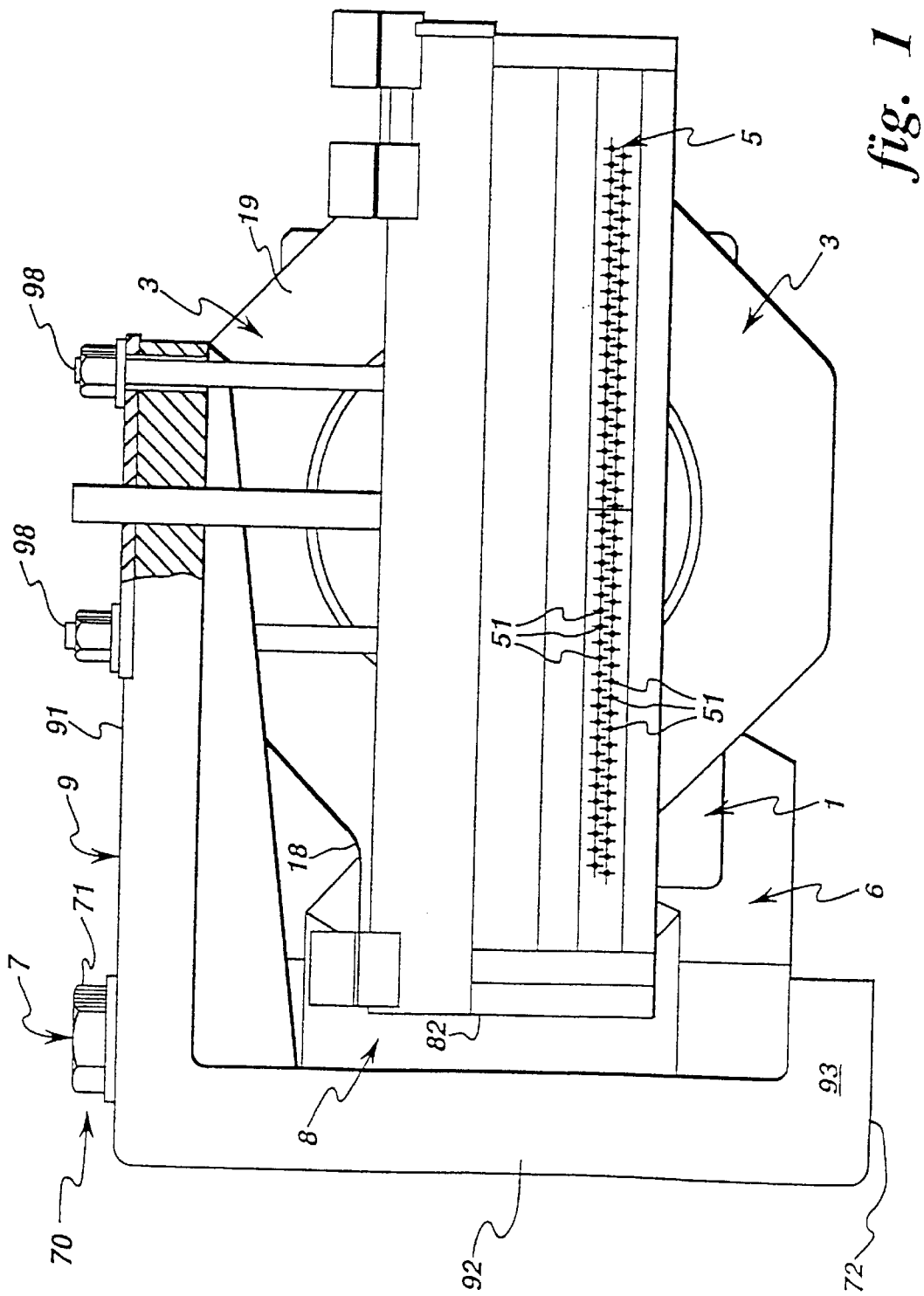
FIG. 1 is a part-sectional schematic front view of a die clamp assembly on an extruder.
Figure 2:
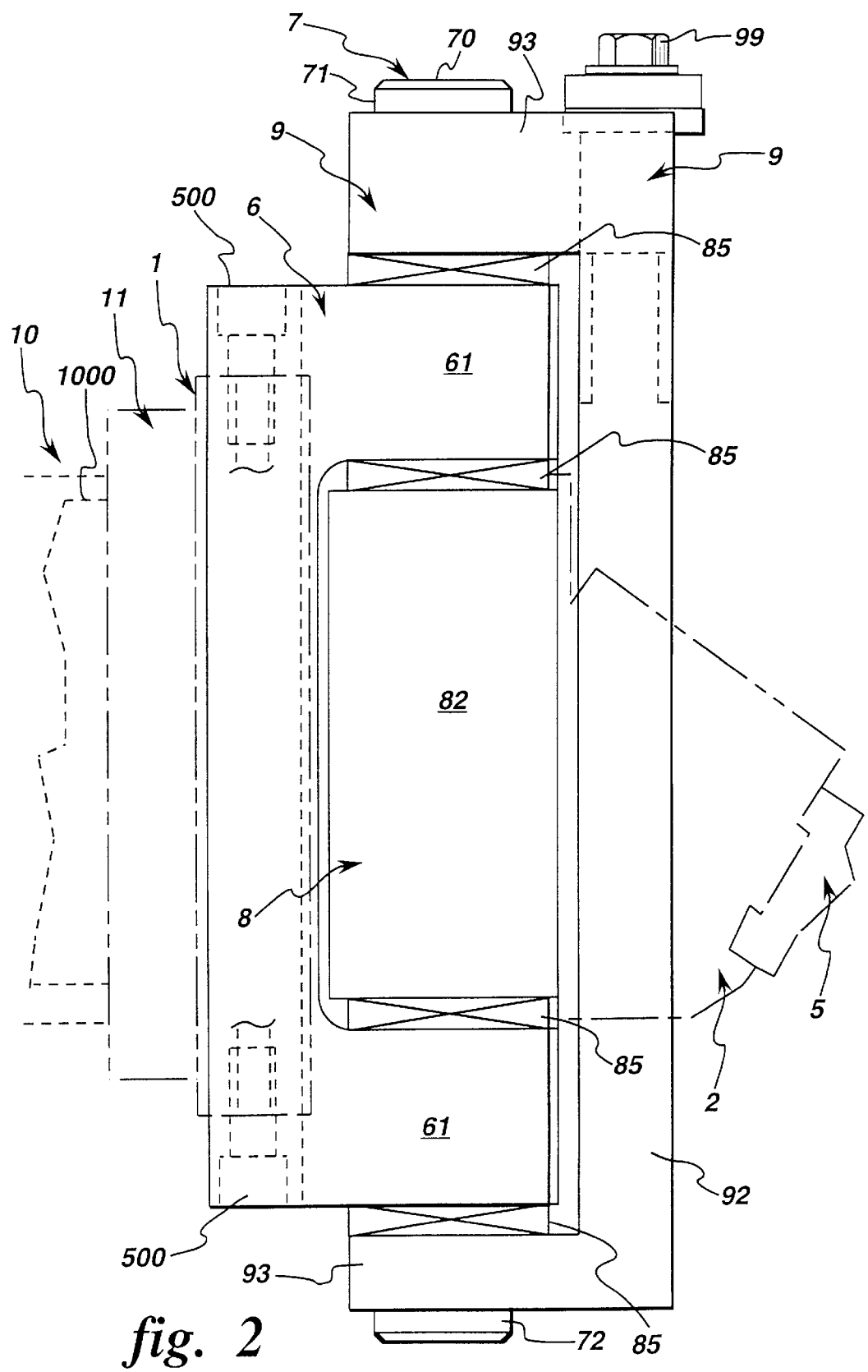
FIG. 2 is a schematic side sectional schematic view of the die clamp assembly on an extruder.
Figure 3:
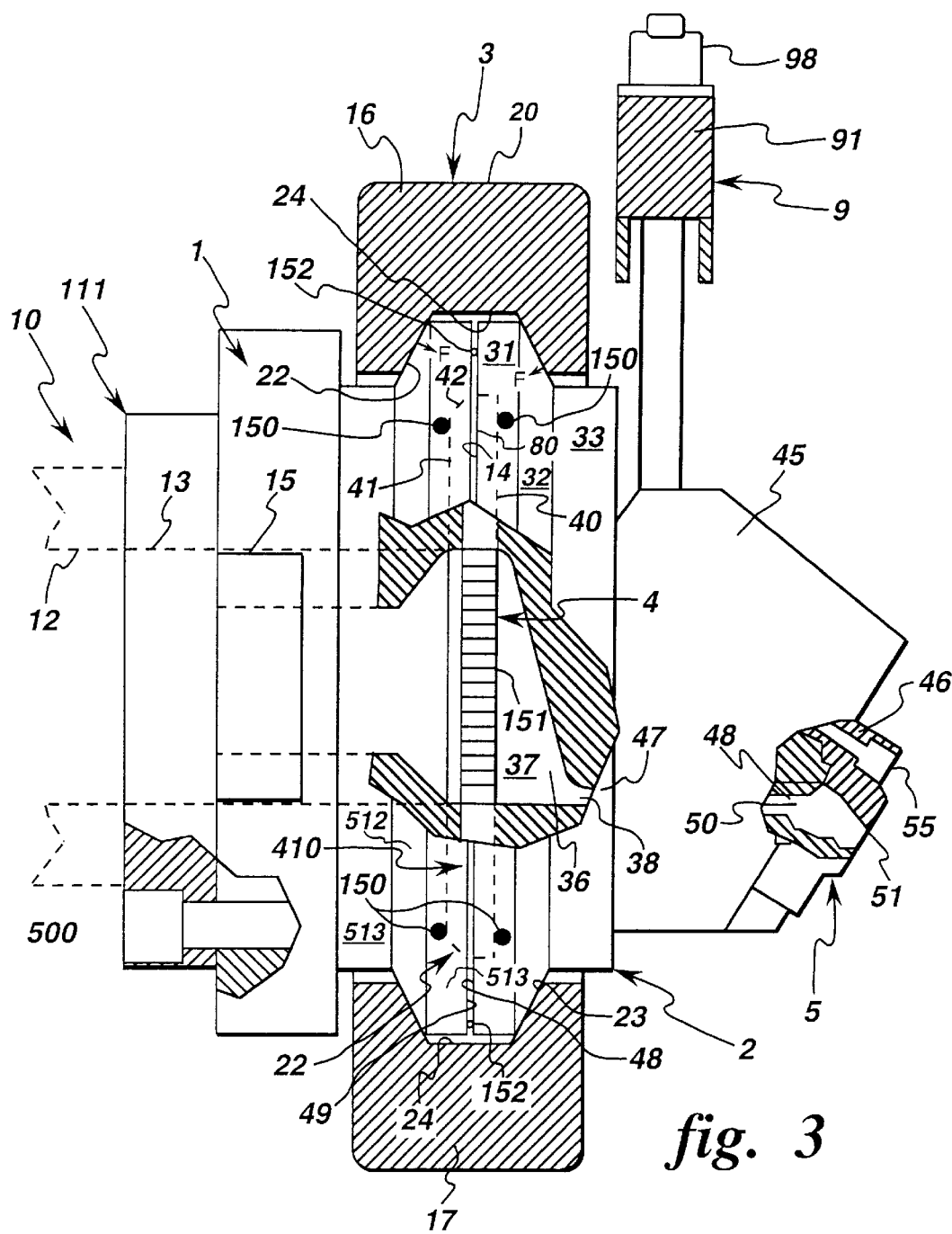
FIG. 3 is a side part-sectional partial schematic view of the die clamp assembly on an extruder.

With reference to FIGS. 1–7, an extruder 10 comprises a last barrel 1001, often referred to as a last portion of the extruder 10, and an extruder flange 11. The extruder flange 11, as illustrated in FIGS. 2 and 3, is connected to the extruder 10 in any appropriate fashion, if not already present on the extruder 10, thus presenting the extrusion die clamp assembly of a modular design that is capable of connection to any extruder. For example, the extruder flange 11 is connected to the extruder 10 by at least one of mechanical connections, frictional connections, magnetic connections, welded connections, integrally molded as a single piece, and combinations thereof.

The extruder 10 comprises a passageway 12 (in phantom in FIG. 3) through which product flows. The passageway 12 may comprise one or more fluid assist devices (not illustrated), such as a screw auger device to move the product through the passageway 12.

The extruder flange 11 comprises a centrally located extruder flange bore 13 is in fluid communication, for example co-axially, with the passageway 12. The positioning of the extruder flange bore 13 and passageway 12 provides a relatively smooth product flow from the passageway 12 to the extruder flange bore 13. The extruder flange bore 13 may comprise a diameter that is one of a greater and a lesser size than the passageway 12 depending on the desired product flow. Alternatively, extruder flange bore 13 is tapered, stepped and configured in any fashion dependent on the desired product flow.

An adapter plate 1 is connected to the extruder flange 11 using an appropriate mechanical connection including, but not limited to, the types of mechanical connections discussed above. For example, FIGS. 2 and 3 illustrate bolts 500 attaching the adapter plate 1 and the extruder 10. The adapter plate 1 comprises an adapter plate bore (passage) 15 that is in fluid communication with, generally co-axially, with the extruder flange bore 13 to provide a relatively smooth product flow. The adapter plate bore 15 is also positioned in fluid communication, for example co-axially, with the passageway 12. The positioning of the adapter plate bore 15 and the passageway 12 provides a relatively smooth product flow from the passageway 12 through the extruder flange bore 13 and to the bore 15. Alternatively, the adapter plate bore 15 in the adapter plate 1 may comprise a diameter of equal to or greater that the diameter of the bore 13. The size depends on the desired product flow, and the size is preferably as big as an extruder screw (if provided), so access to the screw is possible. Further, the adapter plate bore 15 may comprise a tapered, stepped and otherwise configured bore, also dependent on the desired product flow.

A die body 2 is connectable to the adapter plate 1 by a clamp collar assembly (hereafter clamp collar) 3. The clamp collar 3 comprises a first (upper in the figures) clamp collar section 16 and a second (lower in the figures) clamp collar section 17, both of which are known as arms. The upper clamp collar section 16 and lower clamp collar section 17 comprise substantial mirror images of each other, if corresponding portions of the adapter plate 1 and die body 2 are symmetrical. The upper clamp collar section 16 and lower clamp collar section 17 can comprise any appropriate configuration conforming to adjacent surfaces of the adapter plate 1 and the die body 2, as long the clamp collar 3 sealingly holds the die body 2 against the adapter plate 1 so that product does not escape past the adjoining surfaces.

Figure 5:
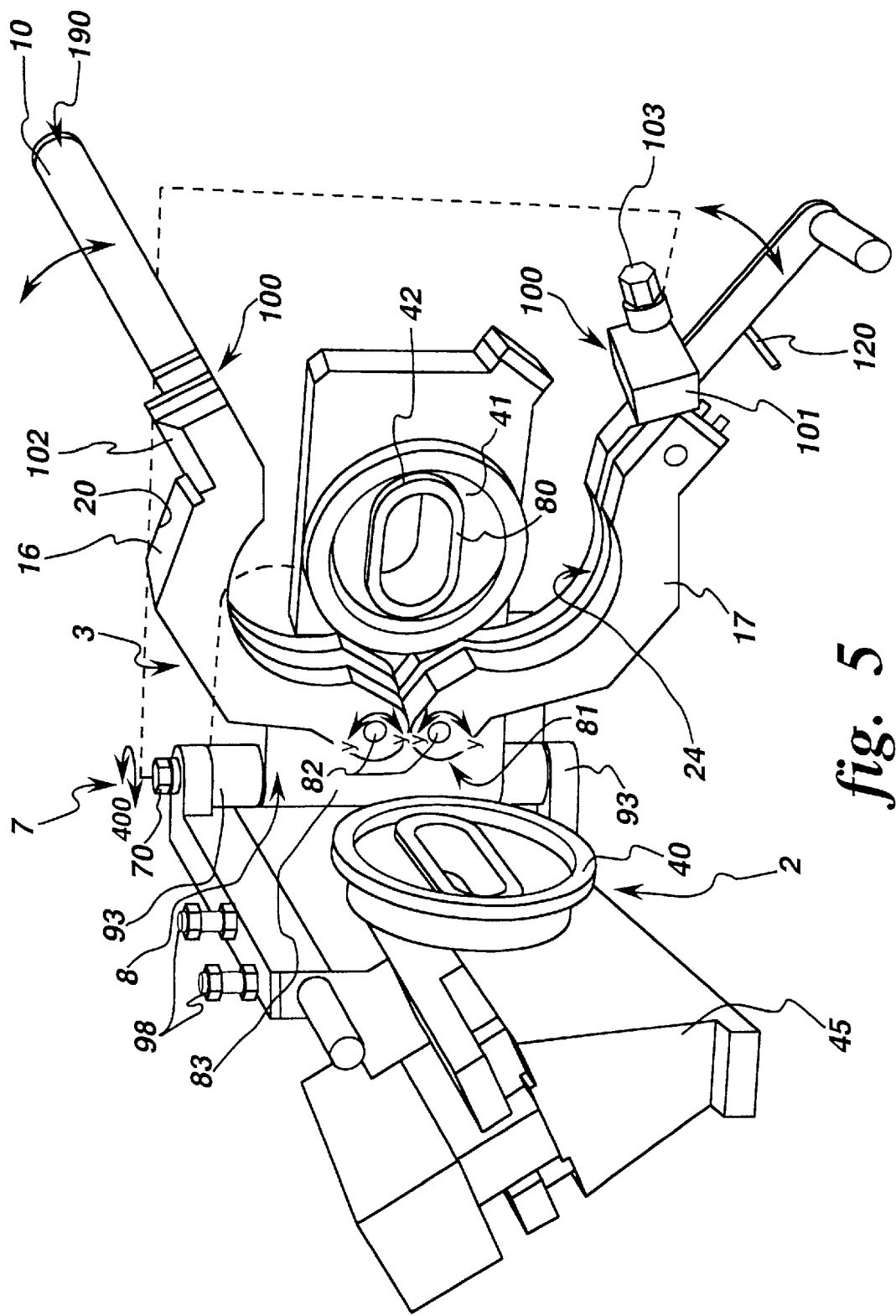
FIG. 5 is a front perspective schematic view of the extrusion die clamp assembly on an extruder with the die clamp assembly open.
Figure 6:
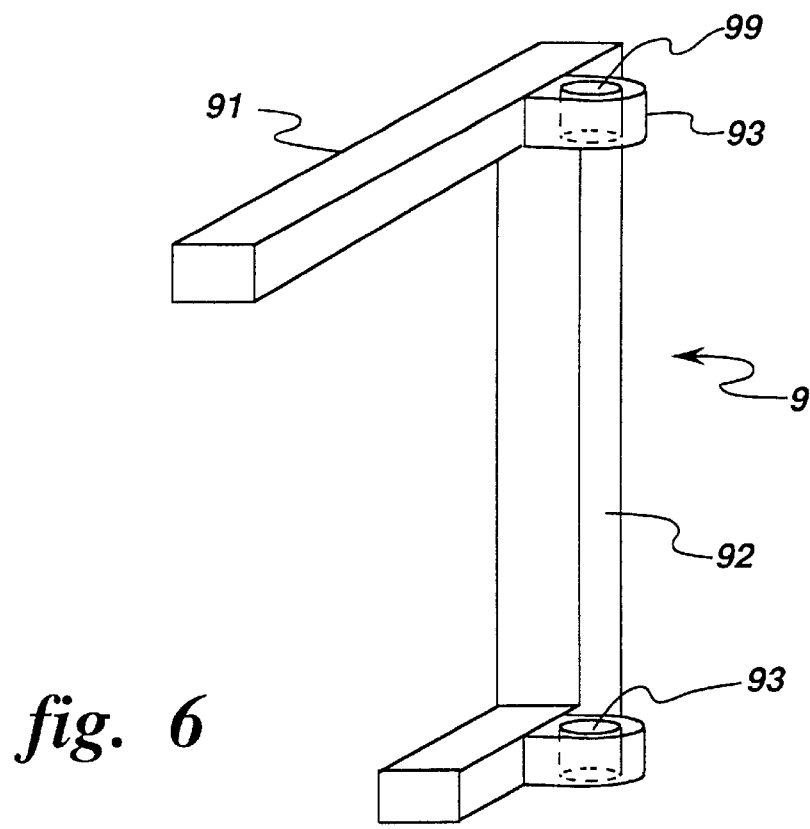
FIG. 6 is a perspective schematic view of a swing arm of the extrusion die clamp assembly in an open position.
Figure 7:
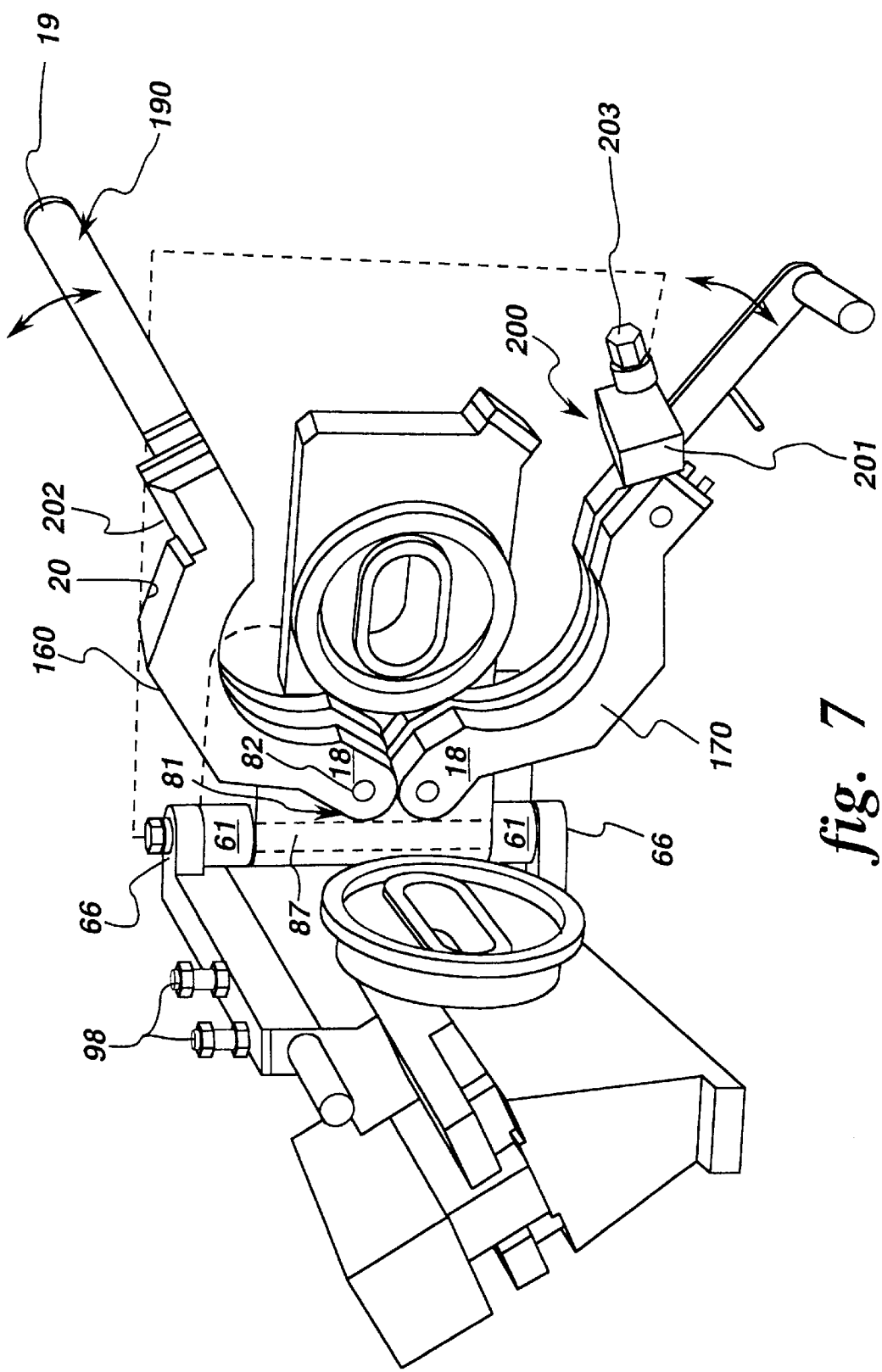
FIG. 7 is a front perspective schematic view of the die clamp assembly on an extruder with the die clamp assembly open.

As illustrated in FIGS. 5 and 7, each of the upper clamp collar section 16 and lower clamp collar section 17 comprise a pivot end 18, which is attached to a pivot mechanism 7, and an end remote 19 from the pivot end 18 that is opposed to the pivot end 18. The clamp collar 3 is opened by being moved in a second direction (arrow y, FIG. 5) and pivoted on the pivot mechanism 7 in a first direction (arrow 400), as illustrated in FIG. 5. The remote end 19 pivots about the pivot end 18, and moves away from the adapter plate 1 in the first direction 400. Each of the sections 16 and 17 also comprise a handle section 190 at the remote end 19. The handle section 190 comprises any appropriate form so an operator can manipulate and pivot the sections 16 and 17.

Mid-portions 107 and 170 (FIG. 7) of the sections 16 and 17, respectively, comprise profiles that substantially conform with adjacent surfaces of the adapter plate 1 and die body 2. Although the figures illustrate the mid-portions of the sections 16 and 17 as generally semi-circular, the configurations are slightly elliptical and oval, rather than perfectly semi-circular to contact the adapter plate and die body 2. This shape permits contact over essentially all of the mating peripheries of the adapter plate 1 and die body 2. Sections 16 and 17 can comprise any appropriate profile to substantially conform with and provide sealing engagement of the adapter plate 1 and die body 2.

Figure 4:
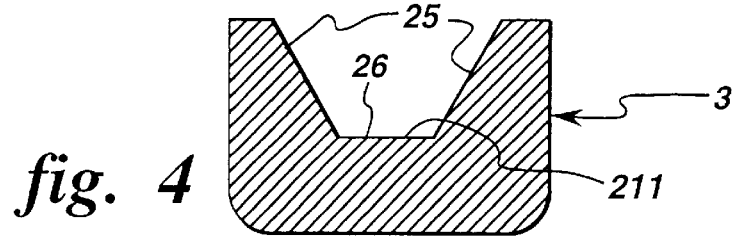
FIG. 4 is a side part-sectional partial schematic view of a clamp collar section of the extrusion die clamp assembly.

The clamp collar 3 is formed of an appropriate material, such as a metal or metal alloy, that maintains its integrity while withstanding operational temperatures and stresses of the extruder 10. The clamp collar 3 comprises an outer surface 20 and an inner surface 24. The inner surface 24 engages an outer surface 22 of the adapter plate and an outer surface 23 of the die body 2. As illustrated in FIGS. 3 and 4, the inner surface 24 is generally formed with a truncated conical profile and comprises side walls 25 and a bottom surface 26. When the clamp collar 3 is in clamped positioned closed, the side walls 25 contact the outer surfaces 22 and 23 with a force F, as illustrated in FIG. 3. This contact forces the adapter plate 1 and die body 2 toward into a self sealing contact metal-to-metal seal, as discussed hereinafter. The bottom surface 26 remains spaced from the outer surfaces 22 and 23 to ensure that the adapter plate 1 and the die body 2 seal. A loss of the seal would result in separation of the adapter plate 1 and die body 2, if the bottom surface 26 is in contact with the outer surfaces 22 and 23.

Figure 9:
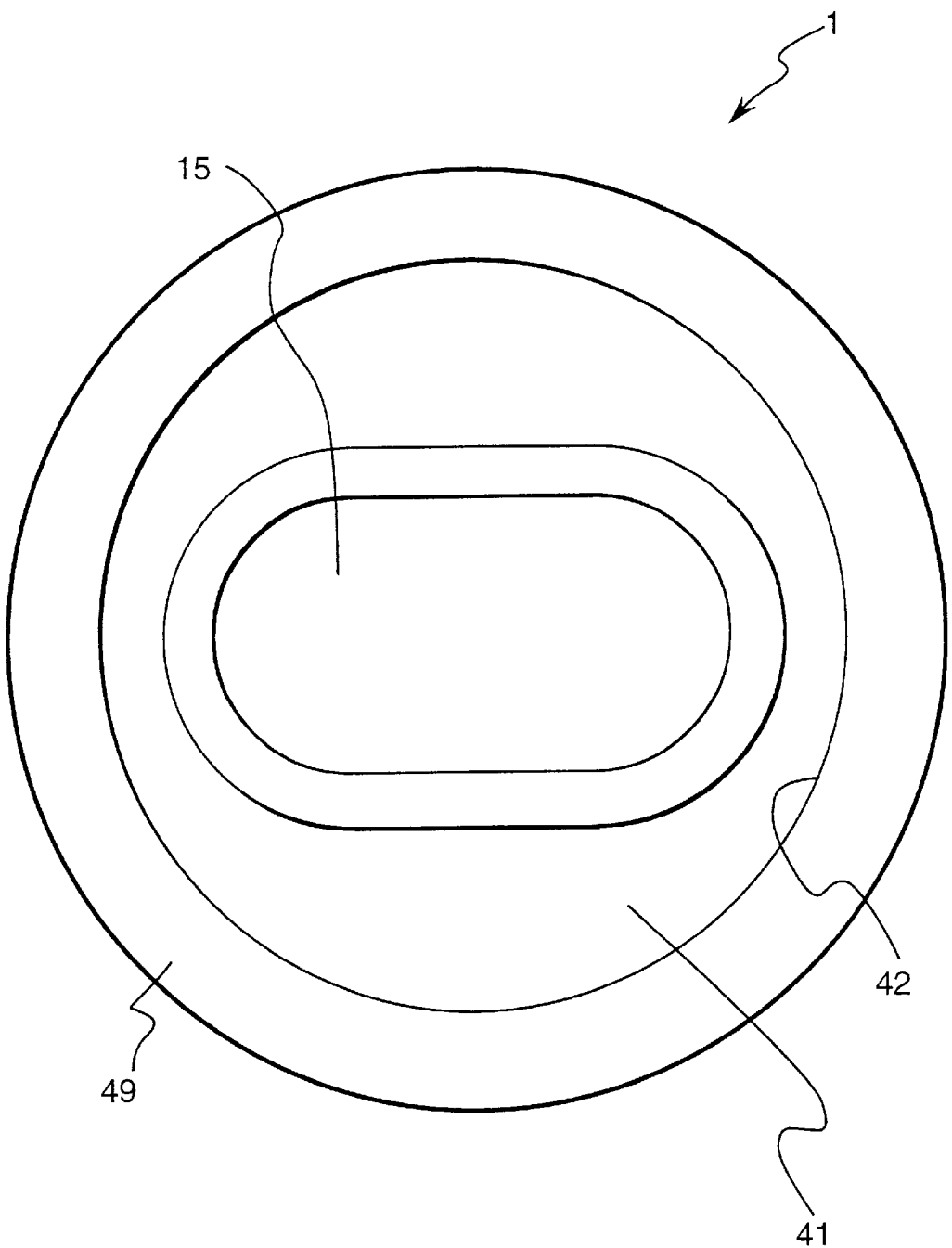
FIG. 9 is a schematic front view of an adapter plate.

The metal-to-metal seal between the adapter plate 1 and die body 2 is formed by contacting surfaces of each element with a breaker plate 4. As seen in FIG. 9, the adapter plate 1 comprises a periphery 49, which opposes a similarly shaped periphery 48 of the die body 2 (FIG. 3). The material of the respective peripheries are hard polished flat surfaces, however one of the surfaces may be formed with a relatively softer metal than the other. Accordingly, the peripheries 48 and 49 will undergo some metal to metal deformation when in contact with adjoining surfaces of the breaker plate 4. The deformation will create a metal-to-metal seal at the peripheries 49 and 48 when the adapter plate 1 and die body 2 are in the closed position against the breaker plate 4.

The die body 2 comprises a first portion 32, otherwise known as the entrance portion, that is juxtaposed to and cooperates with the adapter plate 1, as illustrated in FIG. 3. The first portion 31 defines the periphery 48 spaced from the adapter plate 2, and comprises a recess 40 to receive a breaker plate 4. The second portion 32 (middle portion) comprises a generally tapering portion that has a reducing diameter from the first portion 31 to a third portion 33 (terminus portion).

The adapter plate 1 comprises a first portion 513 (entrance portion) with the periphery 49, and a second portion 512, (middle portion) that comprises a tapering portion. The second portion has an increasing diameter from the first portion 513 to a third portion 511 (terminus portion). As illustrated, the third portion 513 comprises a recess 41 to receive the breaker plate 4.

Each of the first, second, and third portions 31, 32 and 33 of the die body 2, comprise a through passage 35 that is disposed to direct product passing through it from the breaker plate 4 to a die plate 5. The through passage 35 comprises any appropriately shaped passage that permits product flow in a relatively smooth fashion. As illustrated in FIG. 3, the through passage 35 has an entrance portion 36 proximate the breaker plate 4. The through passage 35 then narrows at a mid-passage portion 37 and extends to an exit 38. Product flows from the entrance 36 through the mid-passage portion 37 and to the exit 38. The exit 38 is positioned so a lower portion of the mid-passage portion 37 is essentially linear with a lower portion of the breaker plate 4. Upper sections of the mid-passage portion 37 narrow to the exit 38. This configuration is merely exemplary of possible configurations of the through passage 35 within the scope of the invention, since the configuration of the through passage 35 depends on the location of the exit 38.

The adapter plate 1 comprises a recess 41 and the die body 2 comprises a recess 40. The recess 41 is truncated with a tapered side wall 42 and defines an area 410 in conjunction with the recess 40. The recesses 40 and 41 form a complementary shape to the shape of the breaker plate 4.

The breaker plate 4 comprises a tapered wall 142, which substantially conforms with the wall. Accordingly, as the die body 2 is moved toward the adapter plate 1 with the breaker plate 4 therebetween, the wall of the breaker plate 4 may contact and self-align and self-center itself with respect to the recess 40. This movement will also center and align movement of the adapter plate 1 and the die body 2.

Figure 8:
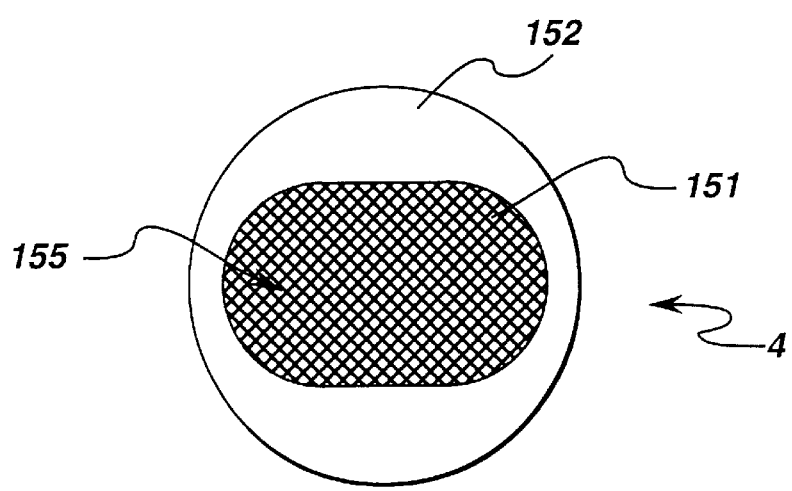
FIG. 8 is a schematic front view of a breaker plate.

The breaker plate 4 comprises a passage 155. The passage 155 comprises an open area for passage of product. Alternatively, the passage 155 comprises a series of openings, such as a screen pack 151 (FIG. 8). The screen pack 151 comprises any appropriate structure that permits product to flow therethrough, such as, but not limited to, separate screens, holes formed in the breaker plate 4 (formed for example by drilling through the breaker plate 4), separate filters, and other similar filtering structures.

The breaker plate 4 can also include peripheral seals 150 positioned within the product passage. The seals 150 prevent leakage of product when the breaker plate 4 is positioned in the area 140 and the clamp collar 3 is in a closed position. Further, a seal 152 may be positioned at the self-sealing surfaces of the adapter plate 1 and the die body 2, to provide a further sealing in addition to the metal-to-metal seal. The seals 150 and 152 comprise any seal structure, such as, but not limited to, O-ring seals, air filled gaskets and other appropriate seal structures.

The die body 2 comprises a die body support 45 that is integral for example formed in one-piece, with the die body 2, thus reducing areas from which leakage may occur. Alternatively, the die body support 45 may be formed as a separate element and connected to the die body 2. The die body support 45 comprises a die body support passage 46, which is in fluid communication with the exit 38. An exit portion 48 of the die body support passage 46 is in fluid communication with a die plate 5 so product flows from the exit 38 to the die plate 5. The die body 2, die plate 5, and die body support 45 comprise a die body assembly 245.

The die plate 5 is preferably a separate element, and is connected to the die body 2 by a connection, such as at least one bolt 55, thus facilitating changing and cleaning. The die plate 5 comprises a die plate passage 50 that is in fluid communication with the exit portion 48 of the die body support passage 46, and leads to at least one outlet 51. The at least one outlet 51 comprises at least one outlet of a shape dependent on the intended end product from the extruder 10. The at least one outlet 51 is positioned at an angle offset from the die plate passage 50, to achieve a desired extruded product. For example, but in no way limiting of the invention, the angle can be about 30°, about 45°, and any appropriate angle in a range between about 0° and about 90° to the die plate passage 50.

The die body 2, as well as the clamp collar 3, is pivotally supported to the extruder 10 by a pivot assembly 7 (FIG. 5). The pivot assembly 7 supports the entire weight of itself, the clamp collar 3 and die body 2, without the need for any additional support. The pivot assembly 7 comprises a single pivot pin 70 that defines a pivot axis for movement of the clamp collar 3 and the die body 2.

The pivot pin 70 comprises an elongated bolt-like member, and is formed from an appropriate material, such as one of a pure elemental metal and an alloy, that can support the entire weight of the pivot assembly 7, the clamp collar 3, the die plate 5 and the die body 2, withstand extruder operating temperatures and be resistant to and non-reactive to the product. The pivot pin 70 comprises an enlarged head section 71 at one end, and the other end is joined to a pivot protrusion 93 of a swing arm 9 (described below), for example by threading. Alternatively, the other end is connected with a nut 72. The pivot assembly 7 supports the components of the extrusion die clamp assembly in substantial alignment to create a sealed structure. For example, the pivot assembly 7 permits the peripheries 48 and 49 to contact the breaker plate 4 and create the metal-to-metal seal.

The pivot assembly 7 also comprises a pivot clamp support bracket 8 that connects the sections 16 and 17 of the clamp collar 3 to the pivot pin 70. As illustrated in FIGS. 1, 2, 6, and 7, the clamp support bracket 8 comprises two arcuate cutouts 81 and a pin 82 that is positioned in each cutout 81. Each pivot end 18 of the sections 16 and 17 comprise holes (not illustrated) that receive a pin 82, so each pivot end 18 is pivotable in the direction of arrows y (FIG. 5) away from the adapter plate 1 and die body 2. The clamp support bracket 8 also comprises a central bore 87 (phantom in FIG. 7) in a main body 83 to pivot the clamp support bracket 8 about the pivot pin 70, and to swing the clamp collar 3 away from the adapter plate 1. The clamp support bracket 8 moves in the direction of arrow 400 once the die body assembly 245, which includes the die plate 5, die body 2, and die body support 45, has been pivoted away from the adapter plate 1.

A swing arm 9 is supported from the pivot pin 70 by support structure including, but not limited to, bolt structures 98 to support the die body 2. The bolt structures 98 extend through the leg 91 to support the die body 2. The die swing arm 9 comprises a generally "L" shaped element with a first leg 91 and a second leg 92. The leg 92 comprises pivot protrusions 93 that include holes 99 to accept the pivot pin 70 of the pivot assembly 7.

A pivot bracket support 6 is mounted to the extrusion die clamp assembly and comprises pivot protrusions 61. The pivot bracket support 6 cooperates with the pivot assembly 7, and is connected to the adapter plate 1 by a connecting structure. Alternatively, the pivot support bracket 6 can be integral, for example formed in one-piece with the adapter plate 1. The pivot protrusions 61 are positioned between the pivot protrusions 93 and the main body 83 of the clamp support bracket 8. The pivot protrusions 61 comprise holes 66 (phantom in FIG. 7) that are generally co-axial with holes 99 of the pivot protrusions 93, and the pivot protrusions 61 cooperate with the pivot protrusions 93 and pivot pin 70 to pivotally support the die body 2 and clamp collar 3.

The pivot assembly 7 may further comprise bearing assemblies 85 to facilitate movement of the features of the extrusion die clamp assembly in the direction of arrow 400. The bearing assemblies 85 are positioned between moving components of the extrusion die clamp assembly, for example between the protrusions 61 and 93 and the protrusions 61 and the main body 81 of the pivot support bracket. The bearing assemblies 85 comprise any bearing structures including, but not limited to roller bearings, bushings, air bearings and combinations of bearing structures.

Figure 10:
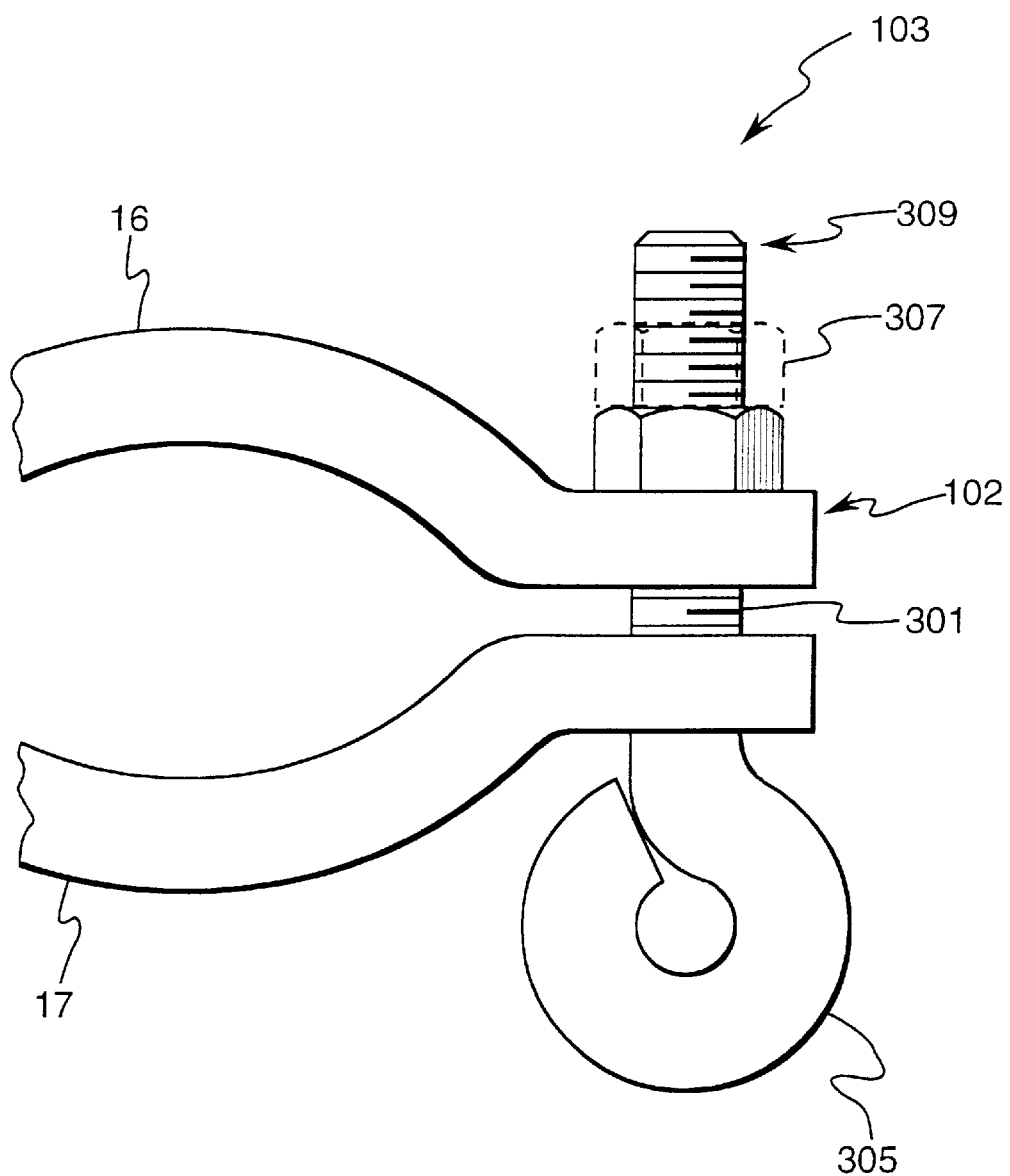
FIG. 10 is a side part-sectional schematic view of a latching structure.
Figure 11:
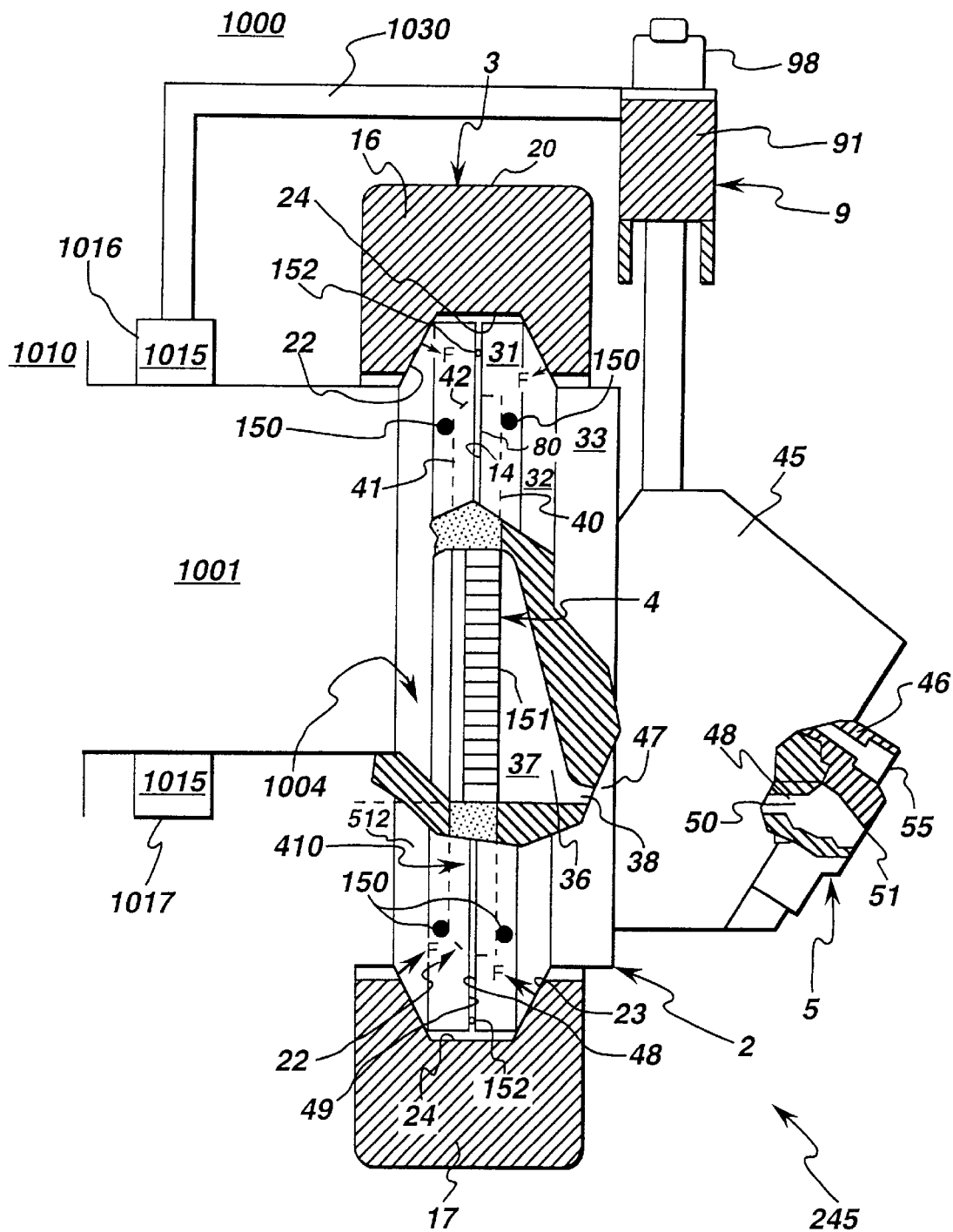
FIG. 11 is a side part-sectional schematic view of another die clamp assembly.
Figure 12:
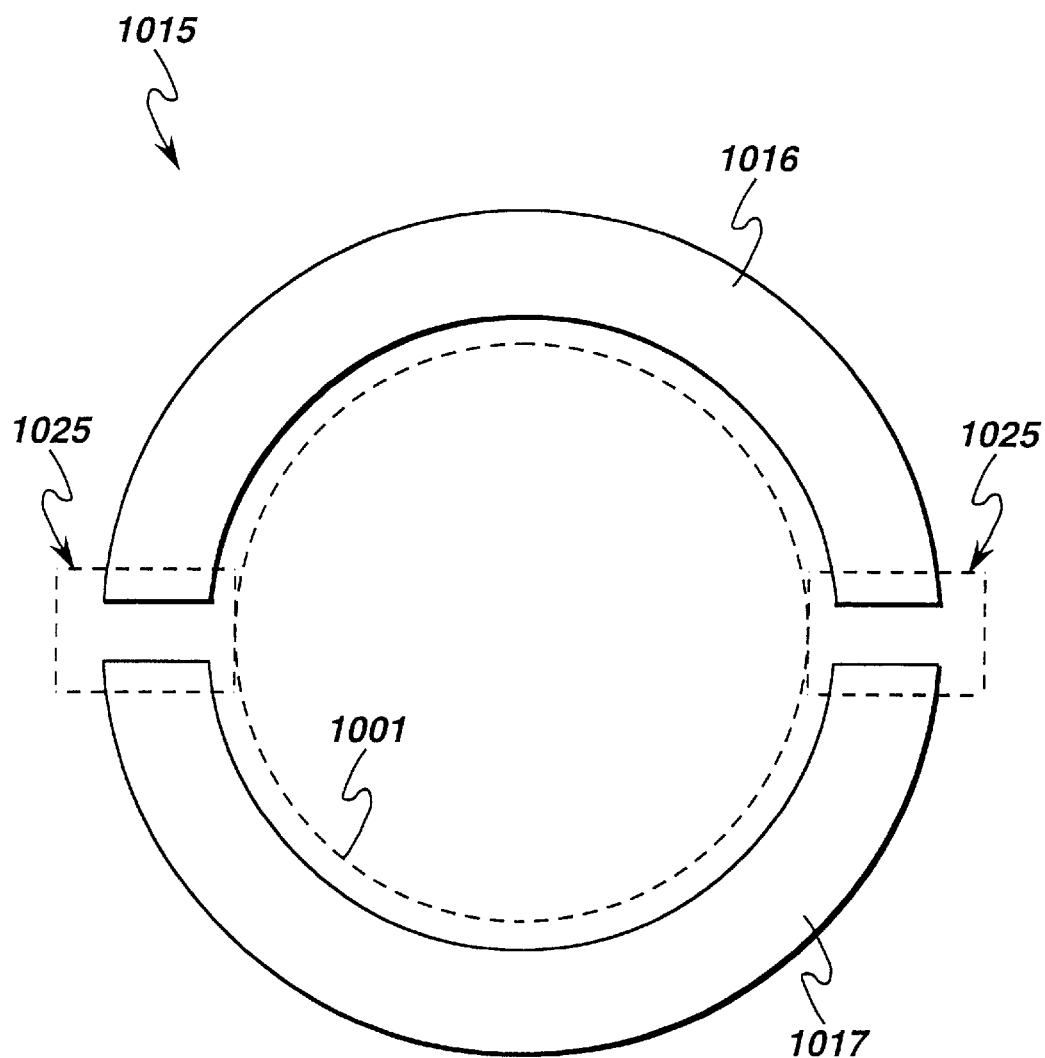
FIG. 12 is a front schematic view of a mounting connecting structure for the die clamp assembly of FIG. 11.

The remote ends of each respective upper and lower sections 16 and 17 of the clamp collar 3 comprise a latching structure 100 to maintain the sections 16 and 17 in the latched closed position, and latch the die body 2 and the adapter plate 1 together. The latching structure 100 comprises any appropriate latching structure including, but not limited to, toggle changes, clasps, locks, interconnecting mechanisms and similar latching structures. As illustrated in FIG. 5, the latching structure 100 comprises a lock member 101 on one portion of the clamp collar 3 and a locking abutment 102 on the other portion of the clamp collar 3. One of sections 16 and 17 may comprise one of the lock member and locking abutment and the other of the sections 16 and 17 may comprise the other of the locking member and the locking abutment.To latch the latching structure 100, sections 16 and 17 are bought into approximately abutting position by pivoting them about pivot pins 82, and the locking member 101 is then rotated. The locking member 101 will abut against the slotted locking abutment 102 in a latched close position securing the sections 16 and 17 together. Thus, the clamp collar 3 will sealingly mate the adapter plate 1 and die body 2. The pivoting locking member 101 can also comprise a clamp bolt and nut, such as a pivoting eye bolt 301 and nut 303 arrangement to further secure the locking member 101 to the locking abutment 102 (FIG. 10). With the locking member 101, the eye bolt 301 is supported on an axis 305 and is pivoted about this axis 305. To open the locking member 101, the nut 303 is loosened from its contacting position with the locking abutment 102, but not separated from the eye bolt 301, so the nut 303 moves from the latched position (solid lines in FIG. 10) to the un-latched position (phantom in FIG. 10). In the unlatched position, the nut 301 is remote from and not in contact with the slotted locking abutment 102. The eye bolt 301 can then be pivoted about the axis 305 in the direction of arrow 309 to the unlatched position, where the sections 16 and 17 of the clamp collar 3 can be moved to the open position.Alternatively, a second latching structure 200, which comprises a pivoting lock member 201 on one portion of the clamp collar 3 and a locking ledge 202 on the other portion of the clamp collar 3 (FIG. 7), can be used. To latch the latching structure 200, the upper and lower sections 16 and 17 are pivoted about the pivot pins 82, and the pivoting locking member 201 is rotated about a pivot 203. The pivoting locking member 201 will then abut the locking abutment 202, and the clamp collar 3 will mate the adapter plate 1 and the die body 2.The operation of the extrusion die clamp assembly with the latching structure 100 will now be described. With the extrusion die clamp assembly in a closed position, the latching structure 100 is unlatched, for example by loosening the clamp bolt 103 (if provided), and the locking member 101 is released from the locking abutment 102. Once the latching structure 100 is released, and the upper and lower sections 16 and 17 can be moved in the direction of arrow x from a closed position to an open position. With respect to the figures, section 16 is pivoted in a counterclockwise direction and section 17 is pivoted in a clockwise direction to open the clamp collar 3 (section 16 is pivoted in the clockwise direction and section 17 is pivoted in the counterclockwise direction to close the clamp collar 3).The lower section 17 may then fall away, and otherwise be moved out of engagement with the adapter plate 1 and the die body 2, until it abuts a stop. The stop comprises any stop, including but not limited to, a stop formed as an integral feature of the arcuate cutouts 82, a separate stop 120 (FIG. 5) on the extruder 10 and a combination of these stops. Once the lower section 17 has stopped, the upper section 16 is rotated and raised (a latch, which is not illustrated can be used to maintain the section 16 in a raised position), and the clamp collar 3 is released from the adapter plate 1 and the die body 2. The die body 2, after being released from the clamp collar 3, can be pivoted away from the extruder 10 about the axis formed by the pivot pin 70 in the direction of arrow 400. The clamp collar 3 can then also be pivoted away from the extruder 10 about the axis formed by the pivot pin 70, in the direction of arrow 400.The extruder die clamp assembly is now open and there is access to the breaker plate 4, screen pack 152, any seals, and adjacent surfaces. A breaker plate 4 and screen pack 151 may be changed, and cleaning of extruder surfaces is possible while open. The opening presents minimal product at the breaker plate 4, and thus there is a minimal amount of spillage. The closing of the extruder 10 from the open position to the closed position is achieved by a reversal of the above described steps. The pivot assembly 7 supports the full weight of the die body 2, die body support 45, the weight of the clamp collar 3 and any other elements connected thereto. Therefore, contrary to known clamping arrangements, the extrusion die clamp assembly 500, as embodied by the invention, independently supports itself and of all its components, and does not require outside supports, which is advantageous in extrusion assemblies where extra space is often at a premium or the assembly 500 is required to fit into a compact manufacturing area. Further, the extrusion die clamp assembly comprises a relatively low number of moving parts, which is desirable because there are less moving parts that could break down, fewer parts to fail and to which spillage could adhere.In accordance with a further aspect of the invention, a die clamp assembly 1000 is mounted to a last barrel 1001 of an extruder 1010 (FIG. 11). The last barrel 1001 of the extruder 1010 comprises a flange 1004, which is integral with the barrel 1001. The flange 1004 is formed in a similar construction as the flange portion of the adapter plate 1, as set forth in the above description. Thus, an adapter plate 1 is not needed if the barrel 1001 is provided with a flange 1004.The die clamp assembly 1000 attaches to the barrel 1001 of the extruder 1010 using a mounting connector structure 1015. The mounting connecting structure 1015 fits around the barrel 1001 at a point spaced from the flange 1004, as illustrated in FIG. 11. The mounting connecting structure 1015 supports the remainder of the die clamp assembly 1000, which is essentially similar to the die clamp assemblies discussed above. Accordingly, a further description of these features is omitted.The mounting connecting structure 1015 is formed from rigid material that supports the weight of the remainder of the die clamp assembly 1000. The mounting connecting structure 1015 is preferably formed from a non-reactive and non-corrosive material, such as from the same material as the die clamp assembly components. The mounting connecting structure 1015 comprises two or more elements, that form complementary shape to the circumference of the barrel 1001.One exemplary mounting connecting structure 1015 is illustrated in FIG. 12. The mounting connecting structure 1015 comprises two semi-circular elements 1016 and 1017. The separable elements are separable from each other and connectable by appropriate joining structures 1025. The elements 1016 and 1017 are joined at their respective ends by the joining structures 1025, which permit the mounting connecting structure 1015 to be mounted to the barrel 1001. For example, the joining structures 1025 comprise at least one of nuts and bolts, hinges, pivots, screws, latches, ties, spring clamps, over-center toggles, and other such structures.The mounting connecting structure 1015 includes support structure 1030 that connects to and supports the remainder of the die clamp assembly 1000. The support structure 1030 comprises any appropriate material and structure that connects to the mounting connecting structure 1015 and supports the remainder of the die clamp assembly 1000. For example, and in no way limiting of the invention, the support structure 1030 comprises cast and welded metallic bodies.As noted above, that remainder of the die clamp assembly 1000 is essentially similar to the elements of the die clamp assemblies of FIGS. 1–10. The flange 1004 is held in a sealing arrangement with the breaker plate 4 and the die body 2, in a similar manner as discussed above. Thus, the flange 1004 structure is essentially similar to the flange of the adapter plate 1. Accordingly, the die clamp assembly 1000 provides a quick-change operation of the breaker plate 4 and easy operation of the process machine to which it is connected. While the embodiments described herein are described, it will be appreciated from the specification that various combinations of elements, variations or improvements therein may be made by those skilled in the art, and are within the scope of the invention.

What is claimed is: 1. A die clamp assembly connected to a last barrel of an extruder, the last barrel comprising a flange and the extruder and last barrel define at least one passage through which product flows, the die clamp assembly comprising:

mounting connecting structure that is in fluid communication with the last barrel and the at least one passage of the extruder;

at least one die body comprising at least one die body passage that is in fluid communication with the last barrel, the die body comprising a peripheral surface that corresponds to the flange;

a clamp collar assembly that positions the corresponding flange and peripheral surface against each other in a closed position, and the clamp collar assembly permitting the last barrel and the die body to be separated from each other to an open position; and a pivot assembly that supports the clamp collar assembly for movement in a first pivot direction and a second pivot direction, the pivot assembly supports each of the at least one die body for movement in the second pivot direction, wherein the pivot assembly comprises a first pivot connection that supports the clamp collar assembly for pivoting in the first pivot direction away from each of the at least one die body and the last barrel, and the pivot assembly comprising a second pivot connection that supports the die body and clamp collar assembly to be separately pivotable away from the last barrel in the second pivot direction.2. A die clamp assembly according to claim 1, wherein the pivot assembly comprising at least one pivot pin defining a pivot axis, the pivot pin cooperating with the flange and the die body to pivotally mount the die body and clamp collar assembly to the extrusion die clamp assembly.3. An die clamp assembly according to claim 1, further comprising support structure connected to the mounting connecting structure, the mounting connecting structure supporting the die clamp assembly on the last barrel of the extruder. 4. A die clamp assembly according to claim 1, wherein the clamp collar assembly comprises a first section and a second section.5. A die clamp assembly according to claim 4, the pivot assembly comprising a first section pivot axis and a second section pivot axis, wherein the first section is pivotable about the first section pivot axis and the second section is pivotable about the second section pivot axis, so as to move the clamp collar assembly to the open position and the closed position.6. A die clamp assembly according to claim 4, wherein at least one of the first section and the second section comprise a handle.7. A die clamp assembly according to claim 4, wherein at least one of the first section and the second section comprise a latching structure to maintain the first section and the second section of the clamp collar assembly in the closed position.8. A die clamp assembly according to claim 4, wherein the flange and the die body each comprise outer surfaces, the first section and the second section of the clamp collar assembly conform with the respective outer surfaces of the flange and the die body.9. A die clamp assembly according to claim 8, wherein each of the outer surfaces of the flange and the die body comprise a projection, and the first section and the second section of the clamp collar assembly comprise a groove that substantially conforms with each respective projection.10. A die clamp assembly according to claim 1, further comprising:

at least one die plate comprising at least one die plate passage and at least one opening, the die plate passage in fluid communication with the die body passage, wherein product from the extruder passing through the last barrel to the die body passage to the die plate passage is extruded from the opening, the die plate being connectable to the die body.11. A die clamp assembly according to claim 10, further comprising:

a product flow passage comprising the passage in the last barrel and extruder, the die body passage, the die plate passage, so product flows from the extruder through the product flow passage; and at least one breaker plate, the breaker plate being positioned in the product flow passage, wherein product flows through the at least one breaker plate.12. A die clamp assembly according to claim 11, wherein the breaker plate comprises at least one seal that is disposed to position the breaker plate in the product flow passage.13. A die clamp assembly according to claim 11, wherein the breaker plate forms a seal with the flange and the die body.14. A die clamp assembly according to claim 11, wherein each of the flange and the die body conforms with the breaker plate so as to center and self-align the die plate and the flange.15. A die clamp assembly according to claim 11, wherein the breaker plate comprises a passage for product flow through the breaker plate.16. A die clamp assembly according to claim 15, where the passage comprises at least one of:

a screen pack, holes, and filtering structure.17. A die clamp assembly according to claim 11, wherein the breaker plate is positioned in the product flow passage between the flange and the die body.18. A die clamp assembly according to claim 17, wherein each of the flange and the die body comprise at least one recess, each recess receives the at least one breaker plate.

* * * * *